(12) United States Patent
Miyata (10) Patent No.: US 7,216,893 B2
(45) Date of Patent: May 15, 2007

(54) AIRBAG APPARATUS, MOTORCYCLE WITH AIRBAG APPARATUS

(75) Inventor: Yasuhito Miyata, Tokyo (JP)

(73) Assignee: Takata Corporation (JP)

( * ) Notice: Subject to any disclaimer, the term of this patent is extended or adjusted under 35 U.S.C. 154(b) by 0 days.

(21) Appl. No.: 11/381,491

(22) Filed: May 3, 2006

(65) Prior Publication Data

US 2006/0249936 A1    Nov. 9, 2006

(30) Foreign Application Priority Data

May 9, 2005    (JP)    ............... 2005-136657

(51) Int. Cl.
    *B60R 21/16*    (2006.01)
(52) U.S. Cl. .................................. 280/730.1
(58) Field of Classification Search ............. 280/730.1, 280/728.2, 743.2
    See application file for complete search history.

(56) References Cited

FOREIGN PATENT DOCUMENTS

| JP | 2002137777 | 5/2002 |
|---|---|---|
| JP | 2005008055 A | * 1/2005 |

OTHER PUBLICATIONS

Chinn, B.P. et. al. "Development and Testing of a Purpose Built Motorcycle Airbag restrain System," Fifteenth International Technical Conference on the Enhanced Safety of Vehicles, Proceedings Volume, World Congress Centre, Melbourne, Australia, May 13-16, pp. 1167-1188.

* cited by examiner

*Primary Examiner*—Faye M. Fleming
(74) *Attorney, Agent, or Firm*—Fitch, Even, Tabin & Flannery (57) ABSTRACT

An airbag apparatus which can achieve thorough protection of a rider in case of a vehicle accident is provided. In one form, an airbag apparatus to be mounted to a motorcycle includes an airbag which is deployed and inflated in case of the front collision of the vehicle, and a retainer for storing the airbag. The position where the retainer is installed is set so that the retainer is positioned between a knee portion and an abdominal portion of a rider who has moved toward the front of the vehicle upon the front collision.

18 Claims, 8 Drawing Sheets

AIRBAG APPARATUS, MOTORCYCLE WITH AIRBAG APPARATUS

FIELD OF THE INVENTION

The present invention relates to a technique for constituting an airbag apparatus to be mounted to a vehicle.

BACKGROUND OF THE INVENTION

In the related art, various techniques for constraining a rider by mounting an airbag apparatus on a vehicle such as a motorcycle or the like are known. For example, in a motorcycle, a technique for deploying and inflating an airbag stored in a housing mounted to a vehicle body frame by inflation gas, thereby constraining a rider in case of front collision is known (for example, see Japanese Unexamined Patent Application Publication No. 2002-137777). In this technique, a possibility to secure a wide constraining area by the airbag is proposed. However, in an airbag apparatus to be mounted to a vehicle having such a structure that the periphery of the rider is opened like the motorcycle, constitution of an improved technique effective when constraining the rider radically by the airbag in case of front collision is highly requested.

SUMMARY OF THE INVENTION

In view of such circumstances, it is an object of the present invention to provide a technique of constituting an airbag which enables thorough protection of a rider in case of vehicle accident, and techniques relating thereto.

In order to achieve the above-described object, the invention described hereinafter is provided. The invention described hereinafter typically can be applied to a structure of an airbag apparatus which is mounted to various types of motorcycles. In this specification, the term "motorcycle" which is a typical example of the vehicle widely includes a saddle-type vehicle, that is, a vehicle of a type in which the rider is seated on a seat in a straddled manner. For example, a motorcycle of a touring type having also a fuel tank in front of the rider's seat and a motorcycle of a scooter type having a space formed between the rider's seat and a head pipe for supporting a handle are both included. In addition to the above-described motorcycles, vehicles having three or more traveling wheels and are configured to allow the rider to be seated in the straddled manner (for example, three-wheeled motorcycles used for pizza delivery or the like, or three- or four-wheeled buggy type motorcycles for rough-terrain traveling), and vehicles traveling with skids or caterpillars and are configured to allow the rider to be seated in the straddled manner like a snowmobile or the like are also included widely in the term "motorcycle".

A first form of the present invention for solving the above-described problem is an airbag apparatus as described hereinbelow.

An airbag apparatus of the first form is the airbag apparatus including at least an airbag and a retainer, and is configured to be mounted to a motorcycle. In the present invention, the airbag apparatus may have a structure to be mounted to a motorcycle in a state in which the respective components are integrally modularized, or may be such that the respective components are assembled in sequence to the vehicle.

The airbag of the present invention is deployed and inflated in a rider protecting area formed in front of the rider in case of the front collision of the vehicle by being supplied with inflation gas therein by inflation gas supplying mechanism such as an inflator or the like. The rider is protected by being constrained by the airbag deployed and inflated in the rider protecting area. As a typical example of the rider protecting area, there is an area in the periphery of a lumbar part formed above the knee portion (femoral region) of the rider and below the chest portion of the rider in terms of the vertical direction of the vehicle.

The retainer of the present invention has a function to store the airbag of the structure as described above. The mode of storage of the airbag in the retainer must not necessarily be such that the entire airbag is stored in the retainer, and a mode in which part of the airbag is exposed out from the retainer, and the exposed portion is covered by a cover member can also be employed.

In particular, the airbag apparatus of the present invention is configured in such a manner that when the rider is moved toward the front of the vehicle due to the front collision of the vehicle, the retainer is positioned at a position between the knee portion and the abdominal portion of the rider in terms of the fore-and-aft direction of the vehicle, that is, in the vicinity of the rider. In other words, the position to install the retainer is set to be positioned between the knee portion and the abdominal portion of the rider who has moved toward the front of the vehicle upon the front collision. Accordingly, the airbag stored in the retainer is deployed and inflated in the vicinity of the rider between the knee portion and the abdominal portion of the rider in terms of the fore-and-aft direction of the vehicle in case of the front collision.

According to the structure of the invention of the first form, in the vehicle having a structure in which the periphery of the rider is opened as in the case of the motorcycle, the rider can be reliably constrained by the airbag deployed and inflated in the vicinity of the rider in case of the front collision of the vehicle, and hence thorough protection of the rider is achieved.

In the present invention, the relative position between the passenger and the retainer must simply be such that the retainer is positioned between the knee portion and the abdominal portion of the rider as a result of the movement of the rider toward the front of the vehicle due to the front collision of the vehicle, and the relative position between the rider and the retainer before the front collision of the vehicle is not important. For example, when the amount of movement of the rider who moved toward the front of the vehicle due to the front collision of the vehicle is relatively large, the retainer positioned in front of the knee portion of the rider before the front collision of the vehicle is positioned between the knee portion and the abdominal portion of the rider when the rider has moved toward the front of the vehicle due to the front collision of the vehicle (First Mode). When the amount of movement of the rider who moved toward the front of the vehicle due to the front collision of the vehicle is relatively small, the retainer is positioned between the knee portion and the abdominal portion of the rider both before and upon the front collision of the vehicle (Second Mode). The first mode and the second mode are included in the present invention.

In the present invention, the direction toward the front of the vehicle in which the rider moves upon front collision of the vehicle must simply have at least a speed component toward the front of the vehicle, and the direction toward the front in which the rider actually moves includes various directions such as a horizontal direction, an obliquely upward direction and an obliquely downward direction.

The present invention refers at least to the arrangement of the retainer out of the various components which constitute the airbag apparatus, and the arrangements of other components are not considered.

A second form of the present invention for solving the above-described problem is the airbag apparatus as described hereinbelow.

The airbag apparatus of the second form includes, in the structure of the first form, the retainer positioned on the rear side of the vehicle with respect to the airbag deployed and inflated in case of the front collision of the vehicle. Accordingly, the airbag is deployed and inflated in the vehicle-front side of the retainer positioned in the vicinity of the rider between the knee portion and the abdominal portion thereof in terms of the fore-and-aft direction of the vehicle in case of the front collision of the vehicle. In other words, in the present invention, consideration is taken in such a manner that the retainer is arranged in the vicinity of the rider as much as possible, and the constraining surface of the airbag does not come too close to the rider when the airbag is deployed and inflated.

According to the structure of the invention of the second form, the rider can be constrained reliably and smoothly by the airbag deployed and inflated in the vicinity of the rider in case of the front collision of the vehicle.

A third form of the present invention for solving the above-described problem is the airbag apparatus as described hereinbelow.

The airbag apparatus of the third form, in the structure of the first or second forms, is such that the airbag deployed and inflated in case of the front collision of the vehicle defines an abutment portion which comes into abutment with the member on the vehicle body side on the front side of the airbag with respect to the retainer when the rider is constrained. Then, the abutment of the abutment portion of the airbag with the member on the vehicle body side limits the rotational movement of the airbag toward the front of the vehicle about the retainer. In other words, the airbag deployed and inflated in the rider protection area on the front side of the rider is apt to rotate toward the front side of the vehicle about the retainer due to a forward load exerted by the rider upon constraint of the rider. According to the present invention, the rotational movement of the airbag is limited, and hence the action of the airbag can be stabilized.

According to the structure of the invention of the third form, by the abutment portion defined on the vehicle-front side of the deployed and inflated airbag coming into abutment with the member on the vehicle body side, the rotational movement of the airbag toward the front of the vehicle about the retainer is limited, whereby the constraint of the rider can be stabilized.

Preferably, in the structure in which the retainer is positioned on the rear side of the vehicle with respect to the airbag deployed and inflated in case of the front collision of the vehicle of the second form, it is configured in such a manner that the abutment portion of the airbag comes into abutment with the member on the vehicle body side as described in the third form. In this structure, since the vehicle-front side of the deployed and inflated airbag with respect to the retainer can be widely secured as the abutment portion with respect to the member on the vehicle body side, the action of the airbag when constraining the rider is further stabilized by the abutment between the abutment portion and the abutted portion of the member on the vehicle body side.

In the present invention, the member on the vehicle body side which comes into abutment with the abutment portion of the airbag may be a fuel tank in the case of a motorcycle of the touring type in which the fuel tank is positioned in front of the rider seat. In this structure, by the abutment of the abutment portion defined in the vehicle-front side of the deployed and inflated airbag with the fuel tank, the rotational movement of the airbag toward the front side of the vehicle about the retainer is limited. Depending on the type or specification of the motorcycle, the member on the vehicle body side can be configured using a handle, a seat, a vehicle body frame, or a cowl or the like of the vehicle.

A fourth form of the present invention for solving the above-described problem is the airbag apparatus as described hereinbelow.

The airbag apparatus of the fourth form includes, in the structure of any of the first to third forms, the airbag being configured to be deployed and inflated locally in the lumbar part area of the rider protecting area in terms of the vertical direction of the vehicle body. The term "lumbar part area" in this specification represents an area near the lumbar part of the rider seated on the seat, and widely includes an area formed in the front, side and around the lumbar part of the rider. The lumbar part area corresponds to the local position (local portion) of the rider protecting area in terms of the vertical direction of the vehicle body (the direction of the height of the rider). Typically, the lumbar part area is defined as the range formed in the area upwardly of the knee portion (or femoral region) of the rider seated on the seat and downwardly of the chest portion of the rider, and the airbag can be deployed and inflated within the range of the lumbar part area.

By configuring the airbag to be deployed and inflated in the area upwardly of the knee portion of the rider and downwardly of the chest portion of the rider, the rider is effectively prevented from rising up in case of the front collision of the vehicle. In other words, since the area formed upwardly of the knee portion of the rider and downwardly of the chest portion of the rider substantially corresponds to the center of gravity of the rider, by configuring the airbag to be deployed and inflated locally at least in this area, rising up of the rider upon pitching rotation of the vehicle as well as upon the vehicle collision can be reliably prevented.

Therefore, according to the invention of the fourth form, protection of the rider in case of the vehicle accident can be achieved further reliably. In the present invention, slight vertical displacement of the boundary of the lumbar part area formed upwardly of the knee portion of the rider and downwardly of the chest portion of the rider is accepted.

A fifth form of the present invention for solving the above-described problem is a motorcycle with an airbag apparatus as described hereinbelow.

The motorcycle with the airbag of the fifth form is specified as a motorcycle in which the airbag apparatus of any one of the first to fourth forms is mounted.

Therefore, according to the invention of the fifth form, the rider can be constrained reliably by the airbag deployed and inflated in the vicinity of the rider in case of the front collision of the vehicle, and hence the motorcycle with the airbag apparatus which can achieve thorough protection of the rider mounted thereon is provided.

As described above, according to the present invention, by configuring the airbag apparatus in such a manner that the retainer is positioned between the knee portion and the abdominal portion of the rider when the rider is moved toward the front of the vehicle due to the front collision, thorough protection of the rider in case of vehicle accident is achieved.

DETAILED DESCRIPTION OF THE PREFERRED EMBODIMENTS

Figure 1:
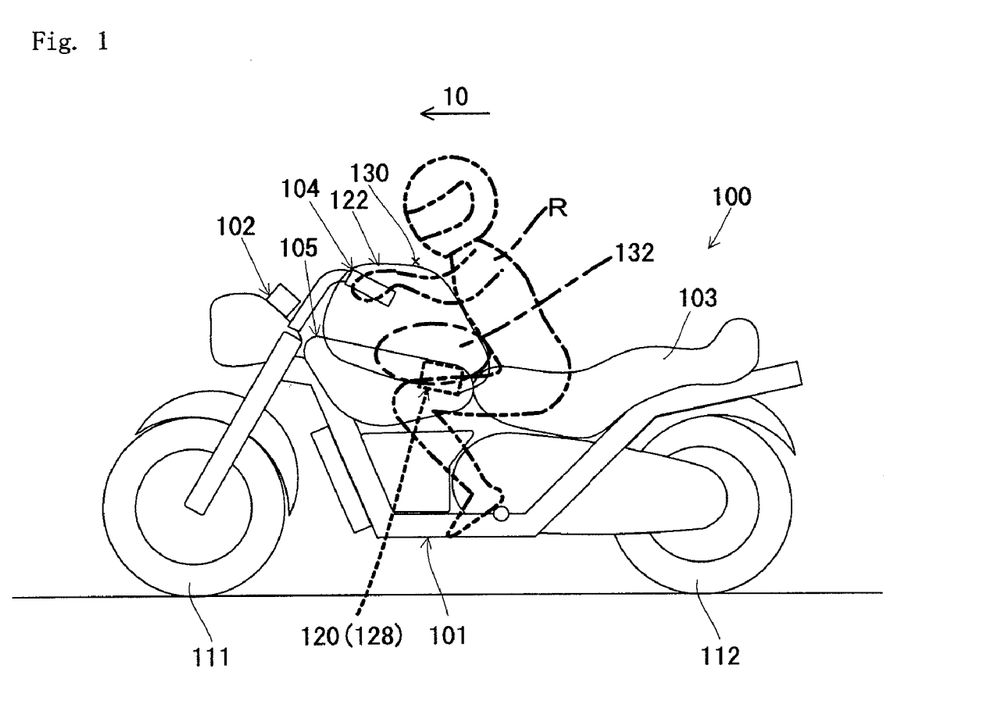
FIG. 1 is a drawing of a motorcycle 100 according to an embodiment of the present invention viewed from the side of a vehicle, showing a state in which an airbag apparatus 120 is mounted to the motorcycle 100.
Figure 2:
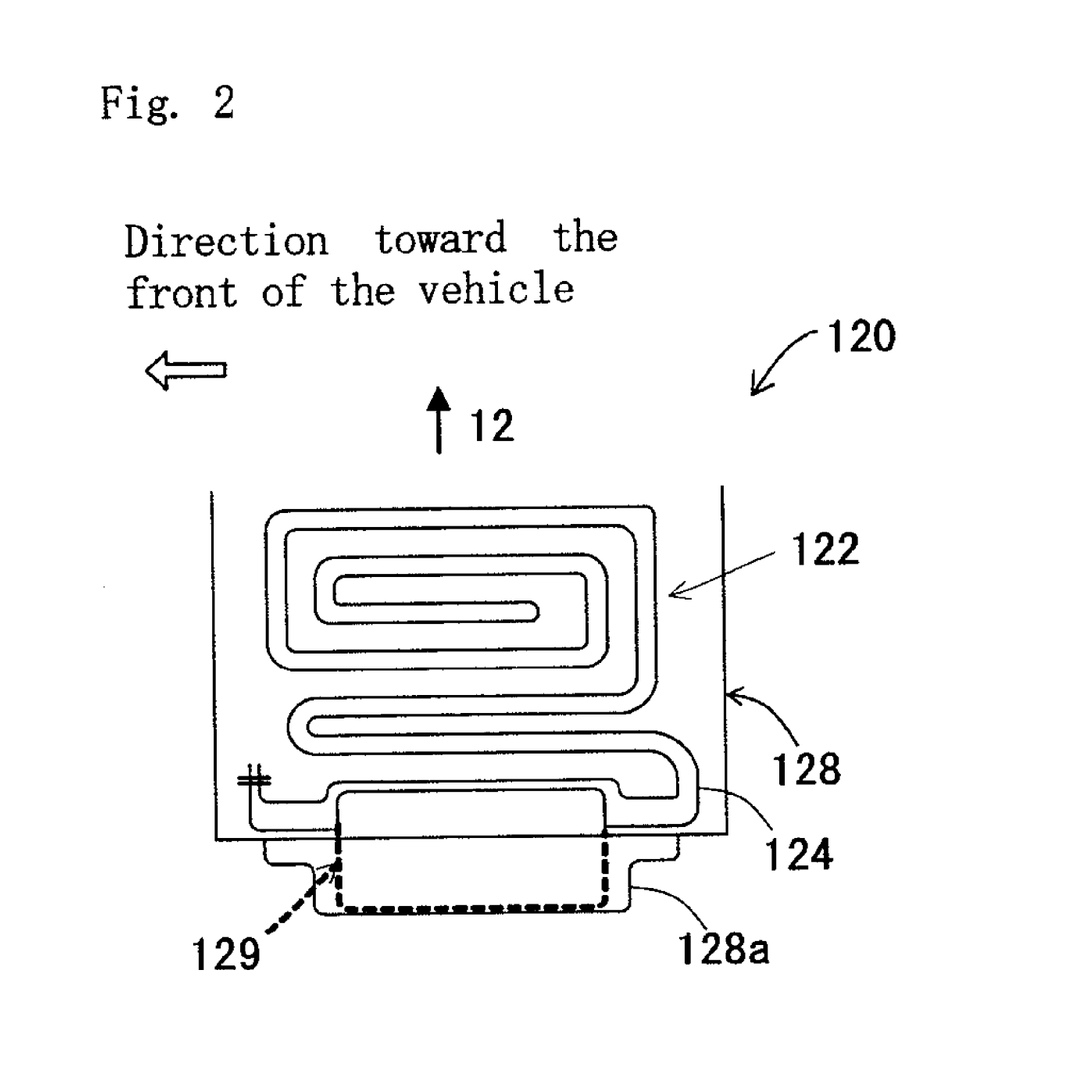
FIG. 2 is a drawing showing a structure of the airbag apparatus 120 in FIG. 1.

Referring now to the drawings, embodiments of the present invention will be described. Referring first to FIG. 1 and FIG. 2, structures of a motorcycle 100 and an airbag apparatus 120 will be described. FIG. 1 is a drawing of the motorcycle 100 according to an embodiment of the present invention viewed from the side, showing a state in which the airbag apparatus 120 is mounted to the motorcycle 100. FIG. 2 is a drawing showing a structure of the airbag apparatus 120 in FIG. 1. The motorcycle 100 in this embodiment corresponds to an example of the "vehicle" or the "motorcycle" in the present invention.

As shown in FIG. 1, the motorcycle 100 is constituted as a motorcycle of a touring type, mainly including a vehicle body structure 101 having an engine, a main frame, and so on, a seat 103 on which a rider R can be seated in a straddled manner, a handle 104, a front wheel 111, and a rear wheel 112 and so on.

An area above the vehicle body structure 101 of the motorcycle 100 in front of the rider R is defined as a rider protecting area 130 in case of front collision of the motorcycle 100. The term "front collision" in this embodiment widely includes a mode in which the motorcycle 100 comes into collision with an object of collision in front thereof (not specifically shown for the sake of convenience). The term "rider protecting area 130" in this embodiment is an area corresponding to the "rider protecting area" in the present invention, and is defined as a space which extends in the direction of forward movement of the rider R when the rider R is moved forwardly of the motorcycle 100 by kinetic energy generated in case of front collision for constraining and protecting the rider R who is apt to be thrown forwardly of the motorcycle 100.

A headlight, various meters, switches are provided on a front portion 102 on the front side of the vehicle body of the vehicle body structure 101, and the airbag apparatus 120 is arranged on the rear portion of a fuel tank 105 arranged on the back side of the front portion 102. The airbag apparatus 120 is typically configured to be mounted to the vehicle body with the respective components integrally modularized. The airbag apparatus 120 in this embodiment is arranged so as to be exposed to the rider protecting area 130 of the rider R. The airbag apparatus 120 corresponds to the "airbag apparatus" in the present invention.

In this embodiment, the airbag apparatus 120 is arranged so that the direction of protrusion (deployment and inflation) of an airbag 122 (described later) which constitutes the airbag apparatus 120 is directed toward a lumbar part area 132 of the rider protecting area 130. The lumbar part area 132 is a local position (local portion) in terms of the vertical direction of the vehicle body (the direction of the height of the rider) of the rider protecting area 130, and is defined by an area formed upwardly of the knee portion (or femoral region) of the rider R seated on the seat 103 and downwardly of the chest portion of the rider R. The lumbar part area 132 corresponds to the "lumbar part area" in the present invention.

The airbag apparatus 120 mainly includes, as shown in FIG. 2, a retainer 128 as an airbag storage body, the airbag 122 to be stored in the retainer 128 in a folded state, and an inflator 129 stored in an inflator storage section 128a of the retainer 128 for supplying inflation gas into the airbag 122 so that the airbag 122 is deployed and inflated from the retainer 128. The retainer 128 corresponds to the "retainer" in the present invention, and the airbag 122 corresponds to the "airbag" in the present invention. In FIG. 2, the direction of protrusion (deployment) of the airbag 122 is indicated by an arrow 12.

Here, referring now to FIG. 3 to FIG. 9, an operating state of the airbag apparatus 120 having the structure described above will be described.

Figure 3:
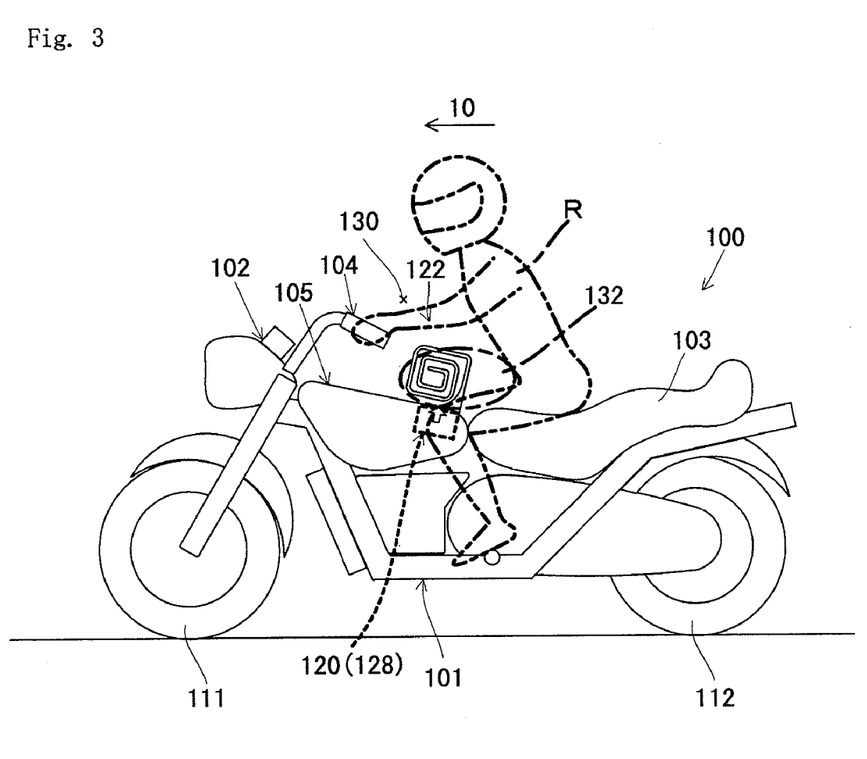
FIG. 3 is a drawing of a state in which deployment and inflation of an airbag 122 are started viewed from the side of the vehicle.

FIG. 3 is a drawing showing a state in which deployment and inflation of the airbag 122 are started due to the front collision of the motorcycle 100 viewed from the side of the vehicle.

As shown in FIG. 3, when the motorcycle 100 is encountered with collision in the direction of travel thereof, the rider R is apt to move (to be thrown) toward a front of the vehicle (for example, the direction indicated by an arrow 10 in FIG. 3) of the motorcycle 100. In this embodiment, by a detection of the front collision, the inflator 129 is activated, and the airbag 122 is started to be protruded (deployed) from the airbag apparatus 120 (retainer 128) toward the lumbar part area 132 of the rider protecting area 130. Then, inflated portion of the airbag 122 is formed gradually from the retainer 128 side by inflation gas continuously fed into the airbag 122. In this manner, the airbag 122 performs the deployment and inflation, thereby being deployed and inflated).

Figure 4:
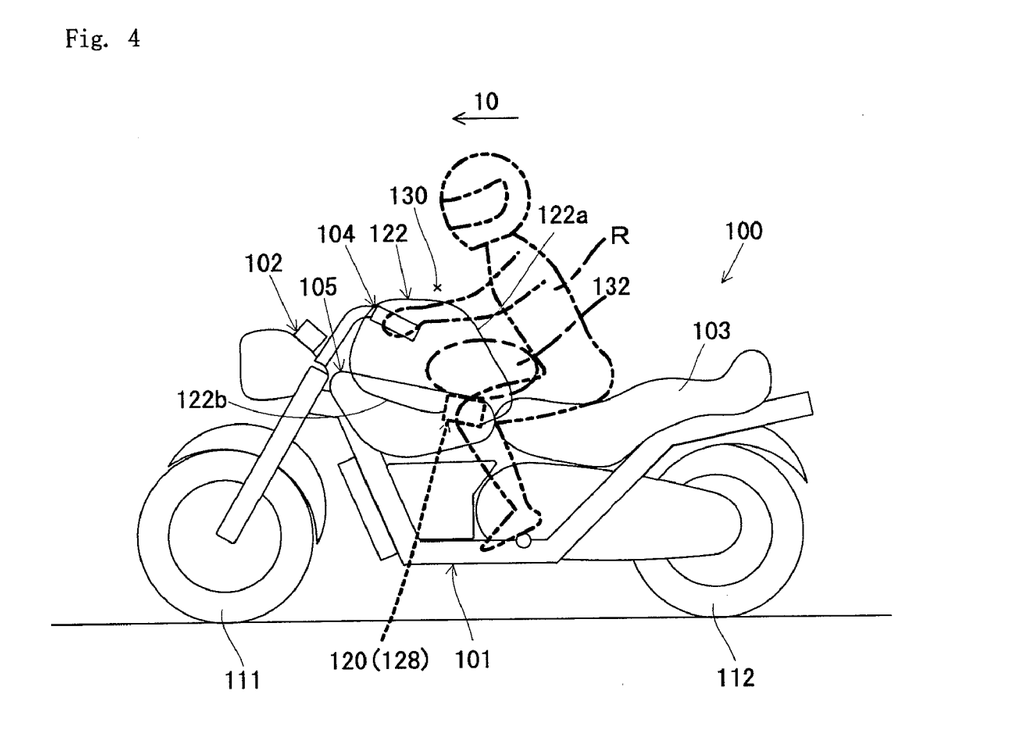
FIG. 4 is a drawing showing a state in which deployment and inflation of the airbag 122 are completed viewed from the side of the vehicle.

In this manner, the state in which the airbag 122 is completely deployed and inflated is established. FIG. 4 is a drawing showing a state of the airbag 122 at the time of deployment and inflation when viewed from the side of the vehicle. As shown in FIG. 4, at the time of deployment and inflation of the airbag 122, the inflated airbag 122 is filled locally in the lumbar part area 132. In other words, the airbag 122 in this embodiment is not deployed and inflated in the wide range over the entire rider constraining area 130, but deployed locally (at the local part) and intensively in the lumbar part area 132.

Figure 5:
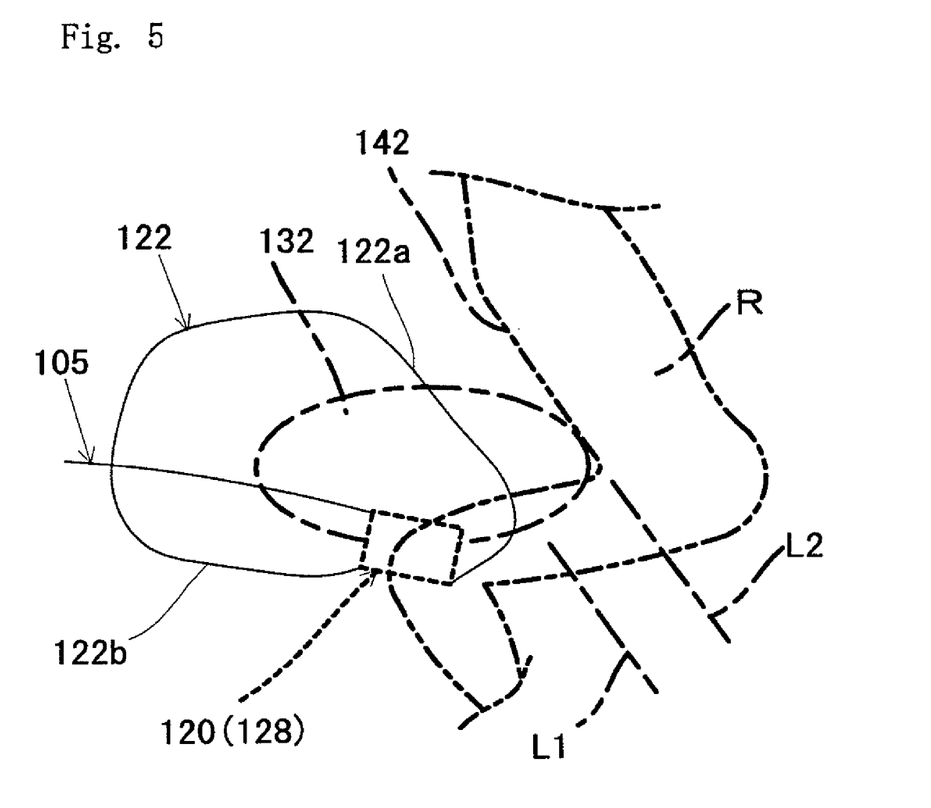
FIG. 5 is an enlarged view of the airbag 122 in FIG. 4.

FIG. 5 is an enlarged view of the airbag 122 in FIG. 4 at the time of deployment and inflation.

As shown in FIG. 5, the airbag 122 forms a constraining surface 122a for constraining the rider R at a portion opposing the rider R at the time of deployment and inflation, and forms an abutment surface 122b that comes into abutment with the fuel tank 105 on the vehicle-front side thereof with respect to the retainer 128. The abutment surface 122b corresponds to the "abutting portion" of the present invention.

In this embodiment, the relative position between the deployed and inflated airbag 122 and the retainer 128 is such that the retainer 128 is positioned on the vehicle-rear side with respect to the deployed and inflated airbag 122.

In this embodiment, the constraining surface 122a of the airbag 122 extends substantially linearly along an extension directional line L1 at the time of deployment and inflation and lies substantially in parallel with a rider front surface 142 extending along a directional line L2 connecting the abdominal portion and the chest portion of the rider R when constraining the rider. In other words, the constraining surface 122a of the airbag 122 is formed along the rider front surface 142 (constrained surface) of the rider R in the course of deployment and inflation. According to the airbag 122 which forms the constraining surface 122a at the time of deployment and inflation, the large constraining surface for constraining the rider R who is apt to move toward the front of the vehicle can be secured to the utmost, and it is also effective for constraining the rider by forming the constraining surface 122a which is effective for constraining the rider R quickly in case of front collision of the vehicle.

On the other hand, the rotational movement of the airbag 122 toward the front of the vehicle about the retainer 128 is limited by the abutment surface 122b (abutting portion) of the completely deployed and inflated airbag 122 being abutted against the fuel tank 105. In other words, the airbag 122 deployed and inflated in the rider constraining area in front of the rider R is apt to rotate toward the front of the vehicle about the retainer 128 by the load in the direction toward the front of the vehicle which is received from the rider R at the time of constraint of the rider. However, according to this embodiment, by limiting the rotational movement of the airbag 122, the movement of the airbag 122 is stabilized, whereby the constraint of the rider R can also be stabilized.

In particular, according to this embodiment, since the retainer 28 is positioned on the vehicle-rear side of the deployed and inflated airbag 122, the front side of the deployed and inflated airbag 122 with respect to the retainer 128 can be widely secured as the abutting portion with respect to the fuel tank 105. Accordingly, the movement of the airbag 122 for constraining the rider R is further stabilized by abutment between the abutment surface 122b of the deployed and inflated airbag 122 and the abutted portion of the vehicle body member such as the fuel tank 105 or the like.

Figure 6:
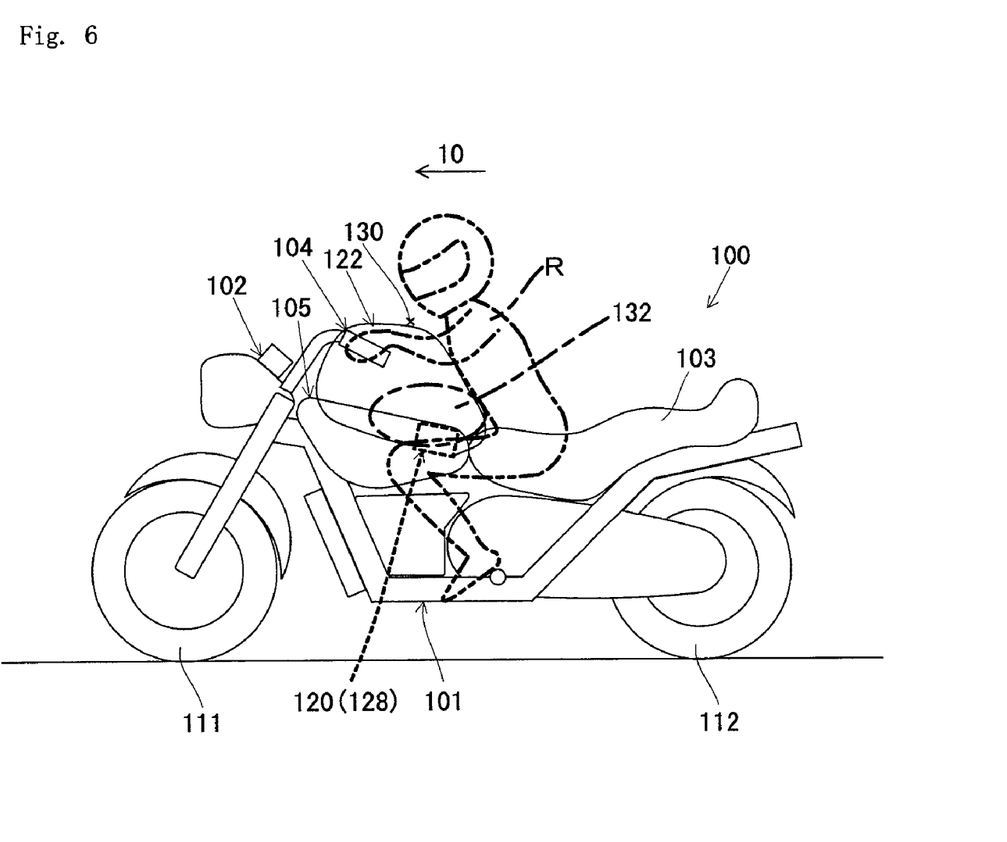
FIG. 6 is a drawing of a state in which a rider R is constrained by the deployed and inflated airbag 122 viewed from the side of the vehicle.
Figure 7:
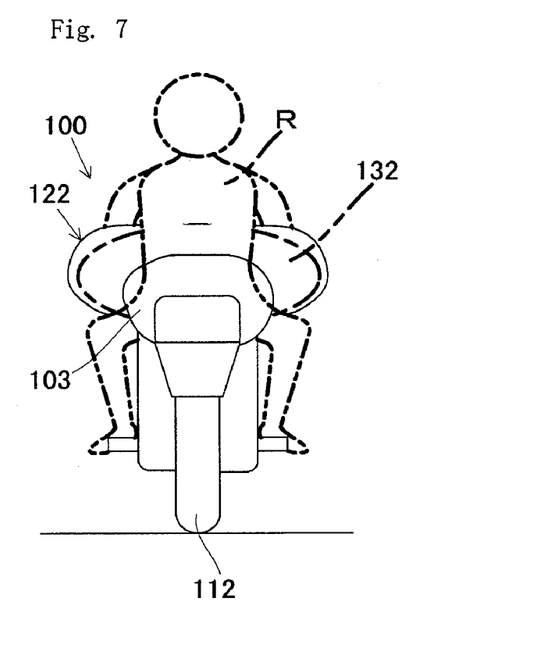
FIG. 7 is a drawing of a state in which the rider R is constrained by the deployed and inflated airbag 122 viewed from the rear of the vehicle.

The rider who has received an impact due to the front collision of the motorcycle 100 is constrained by the constraining surface 122a of the deployed and inflated airbag 122. FIG. 6 shows a state in which the rider R is constrained by the deployed and inflated airbag 122 when viewed from the side of the vehicle, and FIG. 7 shows a state in which the rider R is constrained by the deployed and inflated airbag 122 when viewed from the rear of the vehicle, and FIG. 8 shows a state in which the airbag 122 is locally deployed and inflated in the lumbar part area 132 for constraining the rider R.

The rider who has received an impact due to the front collision of the motorcycle 100 is constrained by the constraining surface 122a of the deployed and inflated airbag 122. FIG. 6 shows a state in which the rider R is constrained by the deployed and inflated airbag 122 when viewed from the side of the vehicle, and FIG. 7 shows a state in which the rider R is constrained by the deployed and inflated airbag 122 when viewed from the rear of the vehicle, and FIG. 8 shows a state in which the airbag 122 is locally deployed and inflated in the lumbar part area 132 for constraining the rider R.

Figure 8:
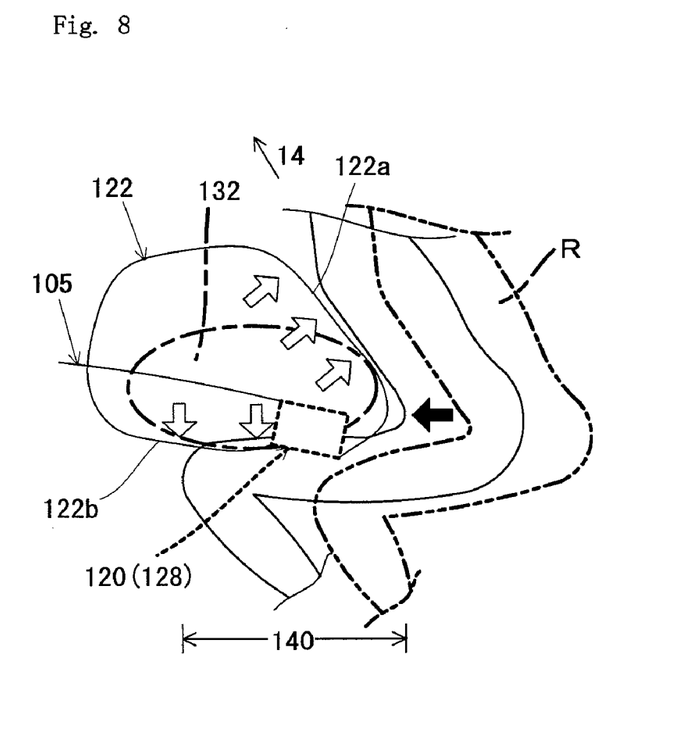
FIG. 8 is a drawing showing a state in which the rider R is constrained by the airbag 122 which is deployed and inflated locally in a lumbar part area 132.

In particular, as shown in FIG. 8, by making the airbag 122 deployed and inflated above the knee portion (femoral region) of the rider R, rising up of the rider R in the direction indicated by an arrow 14 in FIG. 8 in case of the front collision of the vehicle can effectively prevented. In this manner, if the rider R can be reliably constrained at least in the lumbar part area 132 by the deployed and inflated airbag 122, the constraining force for the rider R can be increased. Since the abutment surface 122b of the airbag 122 comes into abutment with the fuel tank 105 and the rotational movement of the airbag 122 toward the front of the vehicle can be limited, the effective constraint of the rider is secured even in the case of the airbag 122 which is deployed and inflated locally in the lumbar part area 132.

The rider R who has received the impact by the front collision of the motorcycle 100 is moved, for example, from a position indicated by a double-dashed line in FIG. 8 to a position indicated by a solid line toward the front of the vehicle (direction indicated by a solid arrow in FIG. 8) by a kinetic energy generated upon collision. Accordingly, the relative position between the rider R and the retainer 128 is changed. In other words, the position of the retainer 128 with respect to the rider R is in the vicinity of the knee portion (see FIG. 5) of the rider R before the front collision of the vehicle. On the other hand, when the rider R is moved to the front of the vehicle due to the vehicle front collision, it approaches the rider R and changed to the area between the knee portion and the abdominal portion of the rider R (an area 140 in the vicinity of the rider in FIG. 8) in terms of the fore-and-aft direction of the vehicle. The area 140 in the vicinity of the rider is specified as an area in the vicinity of the rider R in terms of the fore-and-aft direction of the vehicle out of the area formed on the vehicle-front side with respect to the rider R. In this structure, the airbag 122 stored in the retainer 128 is deployed and inflated in the area 140 in the vicinity of the rider formed between the knee portion and the abdominal portion of the rider R in terms of the fore-and-aft direction of the vehicle in case of front collision of the vehicle. Therefore, the constraint of the rider R by the airbag 122 deployed and inflated in the vicinity of the rider is reliably enabled.

The position of the retainer 128 when the rider R is moved toward the front of the vehicle by the front collision of the vehicle can be set in the area 140 in the vicinity of the rider.

In this embodiment, the relative position between the deployed and inflated airbag 122 and the retainer 128 is such that the retainer 128 is positioned on the vehicle-rear side of the deployed and inflated airbag 122. In other words, in this embodiment, the consideration is taken in such a manner that the retainer 128 is arranged in the vicinity of the rider as much as possible, and the constraining surface 122a of the airbag 122 does not come too close to the rider R when the airbag is deployed and inflated. In this structure, smooth constraint of the rider R by the airbag 122 deployed and inflated in the vicinity of the rider at the time of the front collision of the vehicle is enabled.

Figure 9:
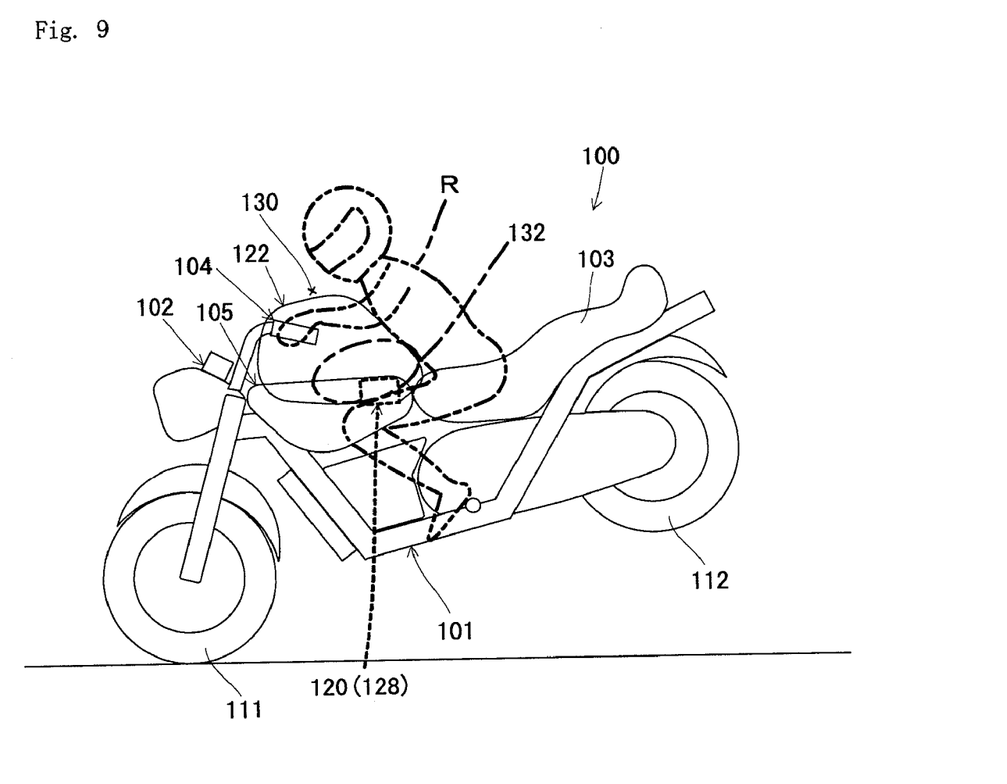
FIG. 9 shows a state in which the rider is constrained upon pitching rotation when viewed from the side of the vehicle.

In addition, there may be a case in which the motorcycle 100 which is encountered with the front collision is subjected to a pitching rotation due to an energy generated upon collision. FIG. 9 shows a state of rider constraint upon pitching rotation when viewed from the side of the vehicle.

As shown in FIG. 9, upon the pitching rotation of the motorcycle 100, the constraint state of the rider R is maintained by the inflated airbag 122. In particular, since it is configured to allow the airbag 122 to be deployed and inflated in the lumbar part area 132 situated downwardly of the chest portion of the rider R to press and hold the femoral region of the rider R which is apt to rise upward from above in the direction indicated by the arrow 14 in FIG. 8, the femoral region is caught by the deployed and inflated airbag 122, and hence the rider R is reliably effectively constrained from above upon such as the pitching rotation of the vehicle. At this time, the abutment surface 122b of the airbag 122 is maintained in the state of being abutted against the fuel tank 105, the rotational movement of the airbag 122 toward the front of the vehicle is continuously limited, and hence the state in which the constraint of the rider R is stabled is maintained.

As described above, according to this embodiment, by considering the arrangement of the airbag apparatus 120 (retainer 128) in the motorcycle 100 so as to be in the vicinity of the rider, the rider can be reliably constrained by the airbag 122 deployed and inflated in the vicinity of the rider in case of the front collision of the vehicle.

According to this embodiment, since it is configured in such a manner that the retainer 128 is positioned on the vehicle-rear side of the deployed and inflated airbag 122, the vehicle-front side of the deployed and inflated airbag 122 with respect to the retainer 128 can be secured widely as an abutment portion with respect to the fuel tank 105, whereby it is effective for stabilizing the operation of the airbag 122 when constraining the rider R. This structure is also effective to prevent the rider R from approaching too much to the constraining surface 122a of the airbag 122 upon deployment and inflation.

According to this embodiment, since it is configured in such a manner that the abutting surface 122b of the deployed and inflated airbag 122 comes into abutment with the fuel tank 105, the rotational movement of the airbag 122 toward the front of the vehicle about the retainer 128 can be constrained, whereby the constraint of the rider upon the vehicle collision or the pitching rotation can be stabilized.

According to this embodiment, by configuring the airbag 122 to be deployed and inflated locally at least in the lumbar part area 132 in the rider protecting area 130, the rider R can be reliably constrained, whereby the thorough protection of the rider R is achieved. In other words, the lumbar part area 132 formed above the knee portion of the rider R and below the chest portion of the rider R substantially matches the center of gravity of the rider R, and hence by configuring the airbag to be locally deployed and inflated at least in the lumbar part area 132, the rising up of the rider can be reliably prevented even upon such as the pitching rotation of the vehicle as well as upon the vehicle collision.

In this embodiment, since the airbag 122 is locally deployed and inflated in the lumbar part area 132, it is effective for downsizing the airbag 122 and the retainer 128 or the like for storing the airbag 122 in comparison with the structure in which the airbag 122 is deployed and inflated in the wide range entirely in the rider protecting area 130. For example, it is also conceivable to allow the airbag 122 to be deployed and inflated locally in an area corresponding to the shoulder portion of the rider. However, in this structure, it is necessary to make the airbag to be filled in the wide range, and hence the downsizing of the airbag is limited. In this embodiment, since the airbag 122 is deployed and inflated toward the lumbar part area 132 which is close to the position of installation of the airbag apparatus 120, the airbag 122 and the retainer 128 or the like can further be downsized. Since the constraint of the rider can be maintained while downsizing the airbag 122 and the retainer 128 or the like, the thorough protection of the rider upon vehicle accident is achieved.

The present invention is not limited to the above-described embodiment, and various applications or modifications are conceivable. For example, embodiments shown below in which the above-described embodiment is applied can be implemented.

In the present invention, the structure in which the retainer 128 is positioned in the area 140 in the vicinity of the rider between the knee portion and the abdominal portion of the rider R as a result of the movement of the rider R toward the front of the vehicle due to the front collision of the vehicle is sufficient, and the relative position between the rider R and the retainer 128 before the front collision of the vehicle is not considered.

Although the airbag apparatus 120 provided with the airbag 122 which is deployed and inflated in the lumbar part area 132 out of the rider constraining area has been described in the above-described embodiment, it is also possible to apply the present invention to the structure of the airbag apparatus provided with the airbag which is deployed and inflated in the rider constraining area other than the lumbar part area 132.

Although the retainer 128 is positioned on the vehicle-rear side of the deployed and inflated airbag 122 in the embodiment described above, the relative position between the retainer 128 and the deployed and inflated airbag 122 in terms of the fore-and-aft direction of the vehicle can be varied as needed in the present invention.

Although the case in which the abutting surface 122b of the deployed and inflated airbag 122 comes into abutment with the fuel tank 105 has been described in the embodiment described above, it is also possible to be configured in such a manner that the airbag 122 comes into abutment with member on the vehicle body side other than the fuel tank 105, for example, the handle, the seat, the vehicle body frame or the cowl of the vehicle depending on the types or the specifications of the motorcycle. When needed, it may be configured in such a manner that the airbag 122 deployed and inflated in the lumbar part area 132 constrains the rider without coming into abutment with the vehicle side member such as the fuel tank 105.

Although the case in which the airbag 122 deployed and inflated in the lumbar part area 132 constrains the periphery of the lumbar part and the femoral region of the rider R from the front, side, and above has been described in the above-described embodiment, the airbag 122 can be configured to wrap around the lumbar part of the rider R to the rear side.

Although the lumbar part area 132 is defined as the area formed above the knee portion (or the femoral region) of the rider R seated on the seat 103 and below the chest portion of the same, the area can be varied (enlarged or reduced) in the vertical direction as needed.

Although the motorcycle 100 of, so-called, a touring type has been described in the above-described embodiment, the present invention can also be applied to other types of motorcycles such as a scooter type having a space between the handle and the seat, or to vehicles other than the motorcycle 100.

In the above-described embodiments, the case in which the airbag apparatus 120 (retainer 128) is arranged rearwardly of the fuel tank 105 has been described. However, the position to arrange the airbag apparatus 120 (retainer 128) can be changed depending on the types or the specifications of the motorcycle and so on. For example, in the motorcycle of the scooter type, the airbag apparatus 120 (retainer 128) can be arranged on the vehicle body at the lower portion of the seat.

What is claimed is:

1. An airbag apparatus for a motorcycle, the airbag apparatus comprising:
   an airbag to be deployed and inflated generally forwardly of a rider of the motorcycle in a fore-and-aft direction alone the motorcycle upon detection of a front collision of the motorcycle; and
   a retainer for the airbag mounted at a predetermined fore-and-aft location on the motorcycle forwardly of the rider so that upon the front collision of the motorcycle the airbag is inflated to restrain the rider with the retainer generally between knee and abdominal regions of the rider in the fore and aft direction,
   wherein the airbag is configured to be deployed and inflated generally forwardly of the predetermined fore-and-aft location at which the retainer is mounted.

2. The airbag apparatus of claim 1 wherein the airbag has a constraining surface that generally faces the rider when the airbag is inflated, and the airbag is deployed forwardly from the predetermined location at which the retainer is mounted so that the constraining surface is able to receive the rider as the airbag is being inflated.

3. The airbag apparatus of claim 1 wherein the airbag has a constraining surface that extends at an upwardly forward incline from the predetermined location at which the retainer is mounted upon airbag deployment and inflation.

4. The airbag apparatus according to claim 1 wherein the predetermined location of the retainer is generally toward a rear side of the deployed and inflated airbag.

5. The airbag according to claim 1 wherein the inflated airbag has a forward abutment surface for abutting a member of the motorcycle.

6. The airbag apparatus of claim 1 wherein the airbag has a forward abutment portion, and the airbag is generally deployed forwardly from the predetermined location at which the rearwardly located retainer is mounted so that an abutment surface of the forward abutment portion can be maximized in size for engaging a body member of the motorcycle to limit forward rotation of the inflated airbag and stabilize the inflated airbag in engagement with the rider constrained thereby.

7. The airbag apparatus according to claim 1, wherein the airbag is configured to be deployed and fully inflated proximate the predetermined location at which the retainer is mounted in a lumbar part area between knee and chest portions of the rider.

8. A motorcycle comprising:
   a body;
   a seat of the body for supporting a rider thereon;
   handle bars of the body extending upwardly forwardly of the seat;
   a fuel tank of the body between the seat and the handle bars;
   a compact airbag configured to be fully inflated in a small, predetermined area with the inflated airbag having a constraining surface forwardly of the rider; and
   a retainer for the airbag mounted at a predetermined fore-and-aft position along the body proximate the seated rider and such that the constraining surface is positioned to receive the rider during airbag deployment to allow size of the constraining surface of the inflated airbag to be maximized,
   wherein the predetermined fore-and-aft mounting position of the retainer is at a rear portion of the fuel tank, adjacent to and forwardly of the seat.

9. A motorcycle comprising;
   a body;
   a seat of the body for supporting a rider thereon;
   handle bars of the body extending upwardly forwardly of the seat;
   a fuel tank of the body between the seat and the handle bars;
   a compact airbag configured to be fully inflated in a small, predetermined area with the inflated airbag having a constraining surface forwardly of the rider; and
   a retainer for the airbag mounted at a predetermined fore-and-aft position along the body proximate the seated rider and such that the constraining surface is positioned to receive the rider during airbag deployment to allow size of the constraining surface of the inflated airbag to be maximized,
   wherein the seat is sized and configured such that upon a forward collision the predetermined fore-and-aft mounting position of the retainer is between a knee portion and an abdominal portion of the rider.

10. A motorcycle comprising:
    a body:
    a seat of the body for supporting a rider thereon;
    handle bars of the body extending upwardly forwardly of the seat;
    a fuel tank of the body between the seat and the handle bars;
    a compact airbag configured to be fully inflated in a small, predetermined area with the inflated airbag having a constraining surface forwardly of the rider; and
    a retainer for the airbag mounted at a predetermined fore-and-aft position along the body proximate the seated rider and such that the constraining surface is positioned to receive the rider during airbag deployment to allow size of the constraining surface of the inflated airbag to be maximized.
    wherein the airbag is configured to be deployed and inflated generally forwardly from the predetermined fore-and-aft mounting position of the retainer.

11. A motorcycle comprising:
    a body;
    a seat of the body for supporting a rider thereon;
    handle bars of the body extending upwardly forwardly of the seat;
    a fuel tank of the body between the seat and the handle bars;
    a compact airbag configured to be fully inflated in a small, predetermined area with the inflated airbag having a constraining surface forwardly of the rider; and
    a retainer for the airbag mounted at a predetermined fore-and-aft position along the body proximate the seated rider and such that the constraining surface is positioned to receive the rider during airbag deployment to allow size of the constraining surface of the inflated airbag to be maximized,
    wherein the airbag has an abutment portion that engages the body to keep the deployed and inflated airbag from rotating forwardly with the rider engaged therewith.

12. The motorcycle of claim 9 wherein the predetermined fore-and-aft mounting position of the retainer is generally rearwardly of the deployed and inflated airbag, and the airbag has a forward abutment surface that engages the body to keep the inflated airbag from rotating forwardly with the rider engaged therewith, the rearwardly disposed retainer relative to the inflated airbag allowing the abutment surface to be maximized in size along a forward portion of the airbag.

13. The motorcycle of claim 9 wherein the handle bars include an uppermost portion, and the fully inflated airbag includes a corresponding uppermost portion that does not extend substantially above the uppermost portion of the handle bars.

14. A motorcycle comprising:
a body;
a seat of the body for supporting a rider thereon;
handle bars of the body extending upwardly forwardly of the seat;
a fuel tank of the body between the seat and the handle bars;
a compact airbag configured to be fully inflated in a small, predetermined area with the inflated airbag having a constraining surface forwardly of the rider; and
a retainer for the airbag mounted at a predetermined fore-and-aft position along the body proximate the seated rider and such that the constraining surface is positioned to receive the rider during airbag deployment to allow size of the constraining surface of the inflated airbag to be maximized,
wherein the seat and the handle bars are arranged and the compact airbag is sized so that the small, predetermined area in which the airbag is fully inflated is a lumbar part area in a vertical direction from the body that is generally between knee and chest portions of the rider.

15. The motorcycle of claim 9 wherein the airbag has an abutment portion that engages the fuel tank and side portions that extend laterally from either side of the abutment portion to keep femoral regions of the rider from rising upwardly during a front collision.

16. A motorcycle comprising:
a body;
a seat of the body for supporting a rider thereon;
handle bars of the body extending upwardly forwardly of the seat;
a fuel tank of the body between the seat and the handle bars;
a compact airbag configured to be fully inflated in a small, predetermined area with the inflated airbag having a constraining surface forwardly of the rider; and
a retainer for the airbag mounted at a predetermined fore-and-aft position along the body proximate the seated rider and such that the constraining surface is positioned to receive the rider during airbag deployment to allow size of the constraining surface of the inflated airbag to be maximized,
wherein the constraining surface has a forwardly inclined configuration such that the constraining surface extends upwardly and forwardly from a rear, lower portion thereof.

17. The motorcycle of claim 16 wherein the rear, lower portion of the constraining surface is rearwardly from the predetermined fore-and-aft meeting position of the retainer.

18. The motorcycle of claim 16 wherein the seat and handle bars are arranged such that the forwardly inclined configuration of the constraining surface generally match an upper body orientation of the rider.

\* \* \* \* \*

UNITED STATES PATENT AND TRADEMARK OFFICE
CERTIFICATE OF CORRECTION

PATENT NO. : 7,216,893 B2  Page 1 of 1
APPLICATION NO. : 11/381491
DATED : May 15, 2007
INVENTOR(S) : Yasuhito Miyata It is certified that error appears in the above-identified patent and that said Letters Patent is hereby corrected as shown below:

Claim 1, Column 11, line 11, change "alone" to -- along --

Claim 9, Column 12, line 4, change "comprising;" to -- comprising: --

Claim 10, Column 12, line 25, change "body:" to -- body; --

Claim 10, Column 12, line 39, change "maximized." to -- maximized, --

Signed and Sealed this

Twenty-fourth Day of July, 2007

JON W. DUDAS
*Director of the United States Patent and Trademark Office*